United States Patent [19]

Rauchfuss, Jr. et al.

[11] 4,212,422

[45] Jul. 15, 1980

[54] WEB POSITION CONTROLLER FOR WEB TRANSPORT SYSTEMS

[75] Inventors: Charles G. Rauchfuss, Jr., Franklinville; Ralph Herman, Cherry Hill; Harvey R. Barton, Jr., Turnersville, all of N.J.

[73] Assignee: RCA Corporation, New York, N.Y.

[21] Appl. No.: 943,148

[22] Filed: Sep. 18, 1978

[51] Int. Cl.² .................... B65H 23/04; G03B 1/48
[52] U.S. Cl. ........................... 226/196; 242/57.1
[58] Field of Search ........................ 226/15–21, 226/196; 74/241; 242/57.1, 71.8

[56] References Cited

U.S. PATENT DOCUMENTS

| | | | |
|---|---|---|---|
| 3,411,683 | 11/1968 | Bartles et al. | 226/21 |
| 3,598,332 | 8/1971 | Sharkey | 226/196 |
| 3,693,855 | 9/1972 | Bonner | 226/19 |
| 3,973,446 | 8/1976 | Vasilantone | 74/241 |
| 4,049,213 | 9/1977 | Hank et al. | 242/57.1 |

Primary Examiner—Leonard D. Christian

Attorney, Agent, or Firm—Samuel Cohen; Robert L. Troike

[57] ABSTRACT

A web position controller for a web transport system positions and aligns a moving web, having a variable center line, to the predetermined center line of a system utilizing the web. A fixed roller or other means constrains the moving web to contact the input roller at a constant or slightly varying angle, referenced to a pivotal axis of a rocker arm type of, preferably, a statically balanced carriage such that if the elevation of the moving web is above or below the predetermined center line of the web utilization system, the web causes a tilting action of the carriage. Mounted on the carriage are input and output rollers. The tilting action of the carriage changes the elevation of the moving web such that, upon exiting the carriage output roller, the axis of the web is substantially aligned to be coincident with the predetermined line of the system. The web position controller may be used to effect a vertical translation of the moving web while maintaining accurate alignment of the web with the center line of the system.

5 Claims, 4 Drawing Figures

WEB POSITION CONTROLLER FOR WEB TRANSPORT SYSTEMS

The Government has rights in this invention.

BACKGROUND OF THE INVENTION

1. Field of the Invention

This invention relates to positioning a moving web and more particularly to positioning the moving web to be in alignment with a predetermined center line of a moving web system.

2. Description of the Prior Art

In web processing systems, it is necessary that certain operations be performed on a continuously traveling web of a thin material such as magnetic tape, film, paper, sheet metal, carpeting, or the like. In most such processing it is necessary that the traveling web be maintained in proper alignment with the machine that operates on the web.

U.S. Pat. No. 3,693,855, entitled, "Web Guide Apparatus," issued Sept. 26, 1972, to William A. Bonner describes an apparatus employing a pneumatic type sensor for determining and correcting the position of a moving web. Still further, U.S. Pat. No. 3,973,446 entitled, "Web Aligner," issued Aug. 10, 1976, to Michael Vasilantone, describes a device employing a mechanical sensor for sensing and maintaining a predetermined alignment of the moving web.

Aligning the elevation axis of a moving web may be a problem particularly manifested at the input area to web processing systems. The web, such as magnetic tape, being fed into the system from the storage reel mounted in the vertical position may have an elevation center line that intolerably changes. The center line changes because the tape stored on the storage reel may loosen and slip in shipment or because vibration in the environment in which the tape is stored causes the relative position of some windings segments or turns of tape to be at a relative height that is lower than the center line of the reel while other segments or turns may be at a height that is higher than the center line of the reel.

SUMMARY OF THE INVENTION

A web position controller is provided for positioning the longitudinal axis of a moving web relative to a predetermined reference location. The web position controller comprises roller means including a pair of rollers mounted on a pivotal support means for guiding the web over the pair of rollers. The roller means further includes means for limiting the transverse position of the web to a predetermined value. The web guiding means guides the web over the pair of rollers, such that essentially only transverse displacements of the web relative to a predetermined reference axis automatically cause the roller means to pivot in a direction to align the longitudinal axis of the web to the predetermined axis.

DESCRIPTION OF THE PREFERRED EMBODIMENT

Figure 1:
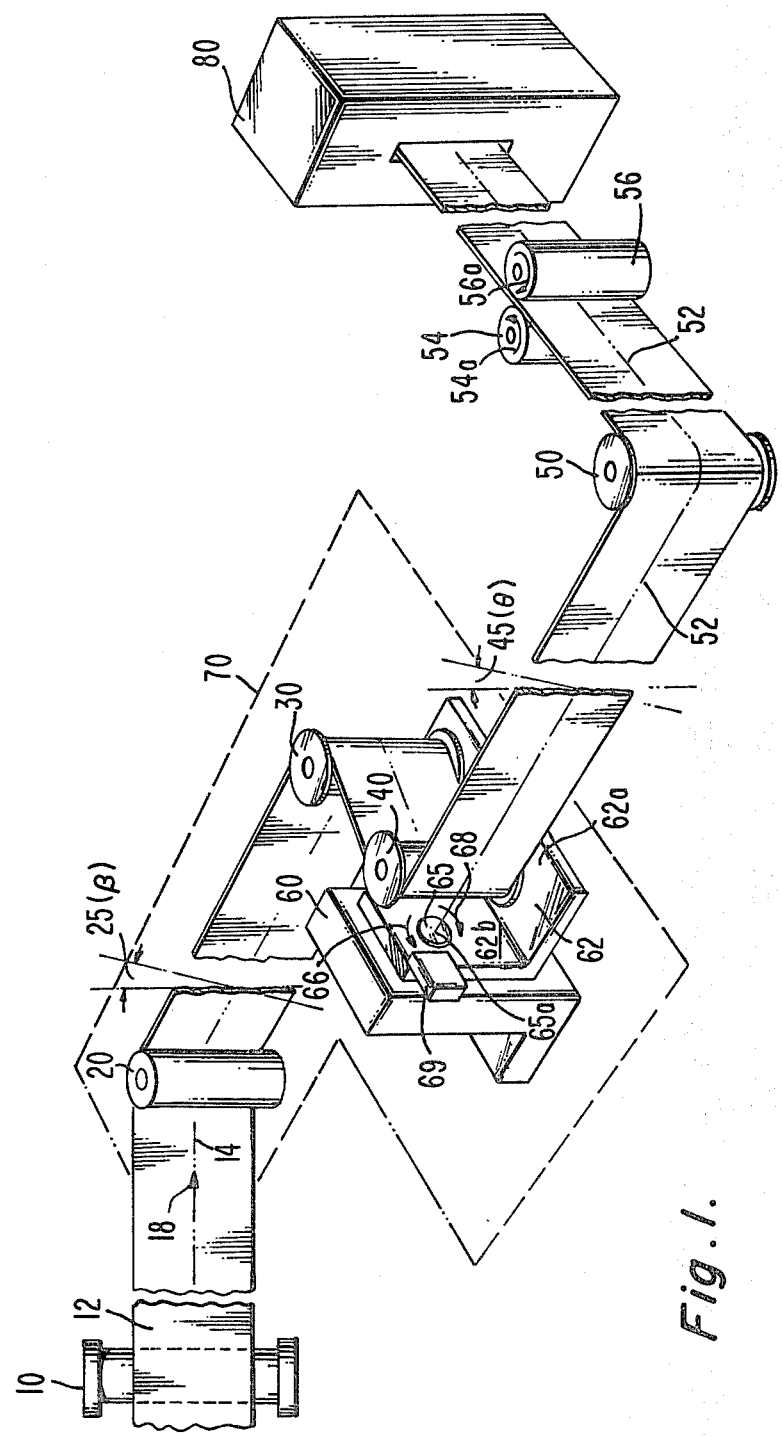
FIG. 1 is an isometric diagram of one embodiment of the invention.

FIG. 1 illustrates the arrangement and organization of the components of a web position controller 70 according to the invention for web transport systems. The web position controller 70 for aligning moving web 12 comprises essentially rollers 20, 30, and 40, a carriage 62, a counterweight 69, a shaft 65 having an axis 65a, and a rigid reference support frame 60. As will be understood from the detailed description to follow, web position controller 70 is a compact, reliable, mechanical device requiring no control power. Further, the web position controller 70 does not employ any means for detecting the position of a moving web. The web position controller 70 corrects automatically the problem, described in the Prior Art section, of aligning the web 12 having a changing elevation, such as conventional magnetic tape, stored on a storage reel and fed into a web processing system 80.

It should be noted that the web 12 does not slide on any of elements 20, 30, and 40. Sliding is deleterious to the web 12. Essentially, the only sliding that will occur in the controller 70 will be due to fabrications variations or departures of dimensions of the components from the design choices.

Tape 12 has a width in one embodiment of 2.000+0−0.004 inches. The movement of tape 12 from a storage reel 10 is in a direction shown by arrow 18. The central longitudinal axis of tape 12 is indicated by dashed line 14. As tape 12 is moved off storage reel 10, it first contacts an entrance roller 20 positioned at the approach side of an input pivotal roller 30. Roller 20 is shown in FIG. 1 as being flangeless. However, flanges may be provided to confine the tape 12 to roller 20 if excessive slack occurs. The flanges on roller 20 must be suitably spaced such that they do not contact tape 12 under normal uninterrupted tape 12 movement. Roller 20 is positioned to limit the entrance angle, between rollers 20 and 30, of the tape 12, as it contacts roller 30. The preferred entrance angle is that which maintains the tape 12, between roller 20 and 30, in a path parallel to axis 65a of shaft 65. Increasing angular deviations from the preferred entrance angle, causes the tape 12 in contact with roller 30 to be deflected in a vertical plane producing a nonuniform stress distribution across the width of the tape 12 at roller 30. The nonuniform stress in tape 12 may present a subsequent problem, such as the curling of tape 12 as it is carried to web utilization means 80. Tape 12 should not curl during operation of the controller 70. Rollers 20 and 30 are spaced from each other a distance of about four to six inches. Preferably this spacing is, at least, two times and, more preferably, three times the width of the web, such as tape 12, to allow for twisting of tape 12. The diameter of input pivotal roller 30 and output pivotal roller 40, to be discussed, is in the order of 0.50 inches. Each of rollers 20 and 50 is rotatably supported with a minimum of wobble on a shaft which, in turn, is suitably fixed to a housing, not shown. Rollers 30 and 40 also are similarly rotatably supported on shafts which are suitably affixed to nonrotating flanges 32, 34 and 42, 44.

Figure 4:
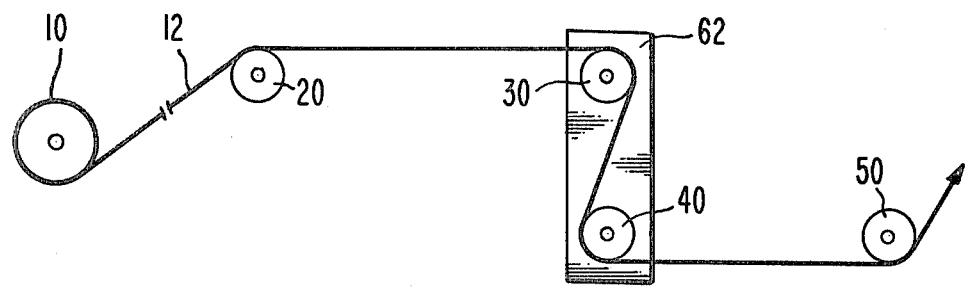
FIG. 4 is a plan view schematic showing the relationship of the rollers of the system.

Tape 12 travels around roller 20, around roller 30 and then diagonally across to roller 40. The path of tape 12 over rollers 30 and 40 causes the tape to be in contact with the surface of the respective rollers for a wrap-around angle of about 135° as seen best in FIG. 4. The wrap-around angle is a matter of choice in the design of the system. If desired, the spacing between rollers 20 and 30 may be selected to limit the space occupied by controller 70 to within the space available within the environment of the system subject to the twist angle 25 (β) requirement, as will be described. It is seen also that the tape 12 passing between rollers 20 and 30 is substantially parallel to the tape 12 exiting from roller 40 which, in the preferred form, has its center line 52 in line with the shaft axis 65a. Roller 50 is positioned to limit the exit angle, between rollers 40 and 50, of tape 12 as it leaves roller 40. Increasing angular deviations from the preferred exit angle wherein axis 65a is in line with center line 52 causes the same stress problem to tape 12 as has been described for the deviations from preferred entrance angle between rollers 20 and 30, that is, the angular deviations cause a nonuniform stress distribution across the width of tape 12 at roller 40. The spacing between rollers 20 and 30 should be large enough, as previously indicated, to allow for twisting of the tape 12 as the alignment process of the invention occurs. Further, the spacing between rollers 40 and 50 is also large enough to allow for the twisting action that occurs on the tape portion exiting from over roller 40. The dimensions of the tape 12 and the material from which it is made will also affect the amount of spacing that is required between rollers 20 and 30 as well as the spacing between rollers 40 and 50 to allow for the twist in tape 12 as it is aligned.

The non-rotating flanges 32 and 34, and 42 and 44, respectively, of roller 30 and roller 40 have a vertical clearance therebetween of not more than 0.002 inches greater than the maximum width of a web such as tape 12. The flanged rollers 30 and 40 thus confine the travel of tape 12 within the non-rotating flanges.

Figure 2:
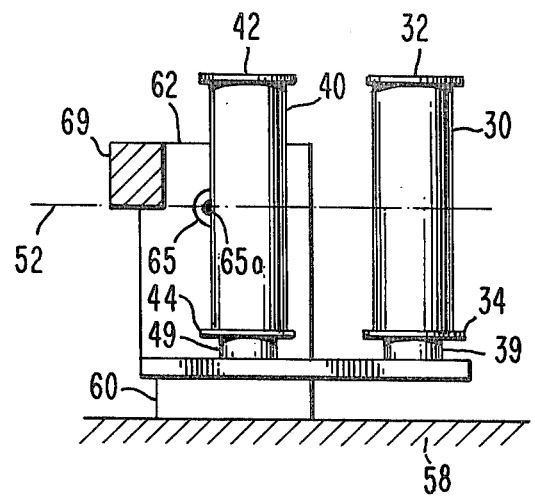
FIG. 2 is a front view showing the mounting of the input and output rollers to the rocker arm carriage.
Figure 3:
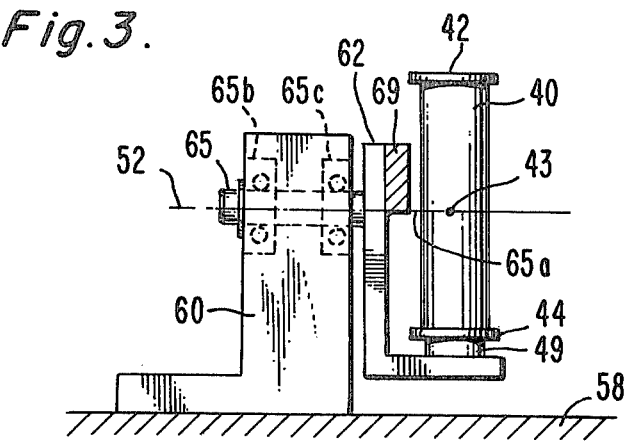
FIG. 3 is a side view showing the mounting of the rocker arm carriage to the rigid reference support.

Reference is now made to FIGS. 2 and 3 for a more detailed explanation of the structure of the web position controller 70.

Rollers 30 and 40 are attached to carriage 62 and are kept parallel to each other by connecting members 39 and 49, respectively. Furthermore, the rollers 30 and 40, are aligned in a plane perpendicular to the axis of rotation 65a of the carriage 62. The spacing between rollers 30 and 40 is a matter of choice in the design of the system. The closer the spacing the faster the response of the system to align misaligned tape 12. The wider the spacing, the greater the correction range of aligning a misaligned tape 12. In a preferred embodiment, the spacing between roller 30 and 40 is 2 inches for a 2-inch tape 12. Carriage 62 is generally an L-shaped member having a platform portion 62a and a side portion 62b. It is mounted in a pivotal relation to housing structure 60 by shaft 65. A counterweight 69, suitably positioned and attached to the upper left corner of side portion 62b counterbalances the weight of carriage 62 and rollers 30 and 40, such that the carriage 62 is statically balanced about shaft 65. By statically balanced is meant that the carriage in its idle state will be balanced such that it can be moved to any orientation about shaft 65 and remain in that orientation. Nevertheless, it should be understood that the controller of the invention will be operative without such static balancing. Static balancing reduces if not minimizes edge loading on the web as it is being passed around the controller. Thus, in an environment where the web is of such character as not to be sensitive to edge wear, the invention may be practiced without precise static balancing, whereas in an environment where magnetic tape is to be used the edge wear problem is severe and accordingly static balance is dictated.

If desired, the function performed by counterweight 69 may be accomplished by a suitable counterbalancing or centering spring, appropriately attached to carriage 62, to provide the required balancing. However, such a spring in lieu of counterbalancing weight may reduce the sensitivity of carriage 62 and therefore increase the flange pressures on the edges of tape 12. A still further means for providing balance is to design carriage 62 with appropriate weight distribution whereby a discrete counterbalancing weight is not required. The preferred embodiment incorporates a counterweight 69 to establish the balancing of carriage 62 for any orientation in which axis 65a is not substantially vertical.

If it is desired to mount carriage 62 in a vertical orientation such that axis 65a is substantially vertical along the gravity gradient the carriage 62 would then be oriented such that gravitational forces on carriage 62 are balanced such that carriage 62 is statically balanced. Therefore, a counterweight 69, a counterbalancing spring, or a centering spring is not needed.

As shown in FIG. 3, carriage 62 via shaft 65 is referenced to a rigid reference support frame 60 which, in turn, is attached to a support structure 58 common to system 80. Support frame 60 is suitably structured such that shaft 65 and thus its axis 65a is precisely aligned rigidly along the predetermined system center line 52. It is a system requirement in a preferred embodiment that axis 65a be coincident within ±0.001 inch of the center line 52. Shaft 65 is centrally secured to support frame 62 and in turn rotates relative to frame 60 by means of bearings 65b and 65c.

Referring back to FIG. 1, the center line or longitudinal axis 14 of tape 12 at the outer diameter of roller 40 is normally substantially coincident with the center line 52 of utilization system 80. The manner in which alignment of changing elevation of the center line 14 of the tape 12 to the fixed predetermined elevation of center line 52 will be discussed later. Tape 12 travels from roller 40 over roller 50 and between input pinch rollers 54 and 56 of system 80. Input pinch rollers 54 and 56 draw tape 12 towards and into system 80. Rollers 54 and 56 are suitably tape tensioning means that cause the tape 12 to be drawn from the storage reel 10 and fed into system 80 in a known manner. Upon entrance into system 80, the operative functions of system 80 are performed on tape 12. System 80 may be any web, such as magnetic tape, processing system and accordingly defining that the web be entered into the system at a predetermined elevation. System 80 is not part of the present invention and, therefore, is not to be discussed in any further detail.

OPERATION OF THE WEB POSITION CONTROLLER 70

In a preferred embodiment, tape 12 on storage reel 10 may be unevenly wound and accordingly have a relative height or elevation deviation of ±50 mils referenced to center line 14 and accordingly center line 52 of system 80. The web position controller 70 accepts the tape 12 having the variable elevation and automatically positions the tape 12 to within ±1 mil in alignment with the fixed center line 52. The web position controller 70 functions such that while a length of tape 12 moving in a straight line cannot change elevation abruptly, it can be gradually twisted and directed around rollers 30 and 40, to be constrained in alignment with center line 52.

For the system to be operative, tape 12 is initially threaded around rollers 20, 30, 40, 50, and between pinch rollers 54 and 56 and into system 80 as illustrated in FIG. 1. Upon the application of power pinch rollers 54 and 56 rotate in directions 54a and 56a, respectively, thereby initiating the movement of tape 12 from storage reel 10. To facilitate the discussion to follow, when referring to a high or low elevation of tape 12, it will be understood that the center line 52 is the predetermined reference position and the term "elevation" is distance above (high) or below (low) that line.

Each winding portion of tape 12 stored on reel 10 drawn out to contact roller 20 will pass around roller 20 at about the same elevation it has on reel 10. The tape 12 from roller 20 to roller 30 is kept at a fixed angle, and preferably is kept parallel to the axis 65a entrance and thus parallel to the tape between rollers 40 and 50 as indicated previously.

The entrance of any portions of tape 12, having a relatively high or low elevation onto roller 30, produces a force at an angle perpendicular to the axis 65a causing carriage 62 to rotate and thus cause pivoting of rollers 30 and 40 about axis 65a.

If the center line 14 of tape 12 at roller 30 is coincident with the center line 52 the carriage 62 remains in a stable condition, that is, the pair of rollers 30 and 40 will not pivot about the axis 65a. Thus, the tape 12 contacts roller 30 and leaves roller 40 without causing any movement of carriage 62.

The response time, measured from a static position to a new position to compensate for high or low elevations of tape 12 roller 30, is dependent upon the mass of carriage 62 and the perpendicular distance between rollers 30 and 40. The mass of carriage 62 determines in part the amount of force required, by a high or low elevation of tape 12 onto roller 30, to cause carriage 62 to initiate a pivoting action about axis 65a. The perpendicular distance between rollers 30 and 40 determines the lever arm of carriage 62 referenced to the axis 65a. The product of the force caused by high or low elevation of tape 12 onto roller 30 and the perpendicular distance between rollers 30 and 40 produce a moment to carriage 62 about axis 65a.

Carriage 62 reacts to the moment initiated by the relatively high or low elevation of tape 12 onto roller 30 by pivoting about axis 65a to tend towards an orientation at which the net vertical forces are zero. This orientation tends to position the center line 14 of tape 12 with the midpoint 43 of roller 40 and thus the center line 52, thereby placing tape 12 at the proper elevation.

Tape 12 contacting roller 30 at a high elevation produces a counterclockwise moment (arrow 66) to carriage 62. The counterclockwise moment causes carriage 62 to be tilted in a relatively upward direction such that the roller 30 is vertically disposed above roller 40. The tape travel from roller 30 to roller 40 is now in a downward direction, thereby, lowering the elevation of tape 12 and upon leaving roller 40 the center line 14 of the tape 12 will tend to approach the center line 52 of the system 80 at a rate based on the sensitivity of the system. Thus, only the transverse displacement of tape 12 is required to cause automatically the web position controller to pivot in a direction to align the longitudinal axis 14 of tape 12 to the center line 52. This is accomplished, it is to be noted, without any other means such as sensors and active control devices responding to such sensors or heretofore practiced in the prior art.

Tape 12 contacting roller 30 at a low elevation develops a clockwise moment which causes a rotation of carriage 62 shown in the direction of arrow 68. The clockwise moment causes carriage 62 to be tilted in a downward direction such that roller 30 is vertically disposed relatively below roller 40. The tape travel from roller 30 to roller 40 is now in an upward direction and upon leaving roller 40, the center line 14 of tape 12 approaches at the center line 52 of system 80. The upper flange 32 of roller 30 defines the upper elevation boundary for tape 12 travel and, conversely, the lower flange 44 of roller 40 defines the lowest elevation for travel of tape 12. The limit set by flanges 32 and 44 in conjunction with the tilting action of carriage 62 positions tape 12 having a variable elevation deviation of ±50 mils, to within ±1 mil of the center line 52.

It should be noted that the use of an exit roller 50 of system 80 is optional. Nevertheless, means must be provided to accommodate any twist in tape 12 as it leaves roller 40 caused by a tilt of carriage 62. Thus, with the use of a roller 50, the spacing between rollers 40 and 50 is chosen to accommodate any twist of tape 12 that may occur. If the system 80 can be positioned to receive the tape 12 in proper alignment, the pinch rollers 54 and 56 can serve to accommodate the twist of tape 12. Thus, pinch rollers 54 and 56, or equivalent rollers means, would be positioned at the location of roller 50 (FIG. 1) to define the exit angle as explained above.

Tape 12 traveling on rollers 30 and 40 is sufficiently tensioned such that there is no significant slippage of tape 12 traveling over any roller particularly rollers 30 and 40. However, the constraining flanges 32, 34, 42, and 44, together with the pivoting action of the roller 30 relative to entrance roller 20 and roller 40 relative to exit roller 50 produce a twisting action of the tape 12. The twisting is manifested as a twist angle 25 ($\beta$) between rollers 20 and 30 about center line 14 and also a twist angle 45 ($\theta$) between rollers 40 and 50 about center line 52.

The respective magnitudes of the twist angles 25 and 45 are caused by the pivoting of carriage 62. The spacing between the respective rollers 20 and 30 and 40 and 50 should be great enough to allow any twist of the tape without stressing the tape. It will be appreciated that if the respective spacing are too short, the twist angle will be limited and furthermore excessive stresses may be developed for large carriage pivots causing possibly tearing or other deleterious effects on the tape 12.

While the embodiment, as illustrated in FIG. 1, is for a system in which reel 10 and the take-up reel of system 80 is in the same plane, a so-called "co-planar" system, the controller of the invention will automatically operate in a system configuration in which the relative elevation of the reel 10 and system 80 are offset from each other in a non-coplanar arrangement. An extreme configuration and one that is very practical is the so-called coaxial system in which the axis of the reel 10 is coaxial with the axis of the reel of system 80. Suitable positioning of the rollers 20 and 50 will provide a path of the tape from the supply reel 10 to the take-up reel in system 80 whether in an upward or downward path relative to the other. In the operation of such a system with an offset elevation carriage 62 will automatically respond to the different elevations and maintain itself in a bias condition corresponding to the degree of offset. The tape 12 in such a configuration will follow either a downward of upward path in the spacing between roller 30 and 40 causing the carriage 62 to be continuously biased about a reference angle corresponding to the degree of offset.

It should now be appreciated that the operation of the web position controller 70 for web transport systems accepts a significant tape deviation from a supply reel and automatically positions and substantially aligns the tape 12 to a fixed center line 52 of system 80. This automatic positioning is accomplished by a simple mechanical means not requiring any other means. Furthermore, the system operates regardless of its orientation provided the carriage is balanced for the orientation of the system in which it will operate.

What is claimed is:

1. A web position controller for maintaining the longitudinal center line of a moving web on a predetermined reference axis, comprising:

a support structure arranged in a fixed position relative to said reference axis;

a carriage pivotally mounted to said support structure to freely rotate about a pivot axis with the pivot axis generally aligned with said reference axis;

a first roller and a second roller rotatably attached to said carriage for conveying the moving web first over said first roller and then over said second roller, said second roller being mounted to the carriage relatively near the pivot axis and said first roller being mounted to the carriage at a point relatively remote from the pivot axis; and said first roller being responsive to transverse displacements of the web to directly and automatically cause said carriage coupled thereto to pivot in a direction to align the longitudinal center line of the moving web conveyed across said rollers with said reference axis.

2. The controller of claim 1 further comprising a roller fixed in position such that a moving web leaving said second roller and passing over said fixed roller is conveyed in a direction parallel to the pivot axis;

said fixed roller sufficiently spaced relative to said second roller whereby the moving web will twist without substantial stress as said carriage pivots.

3. The controller of claim 1 including a counterweight positioned on said carriage to establish a static balance of said carriage.

4. The controller of claim 1 including a roller fixed in position such that a moving web passing over said fixed roller and onto said first roller is conveyed in a direction parallel to the portion of the web leaving said second roller;

said fixed roller sufficiently spaced relative to said first roller whereby the moving web will twist without substantial stress as said carriage pivots.

5. The controller of claim 1 wherein said first and second rollers include means for limiting the transverse position of a moving web, said limiting means comprising non-rotating flanges positioned at both ends of said first and second rollers.

* * * * *